UNITED STATES PATENT OFFICE.

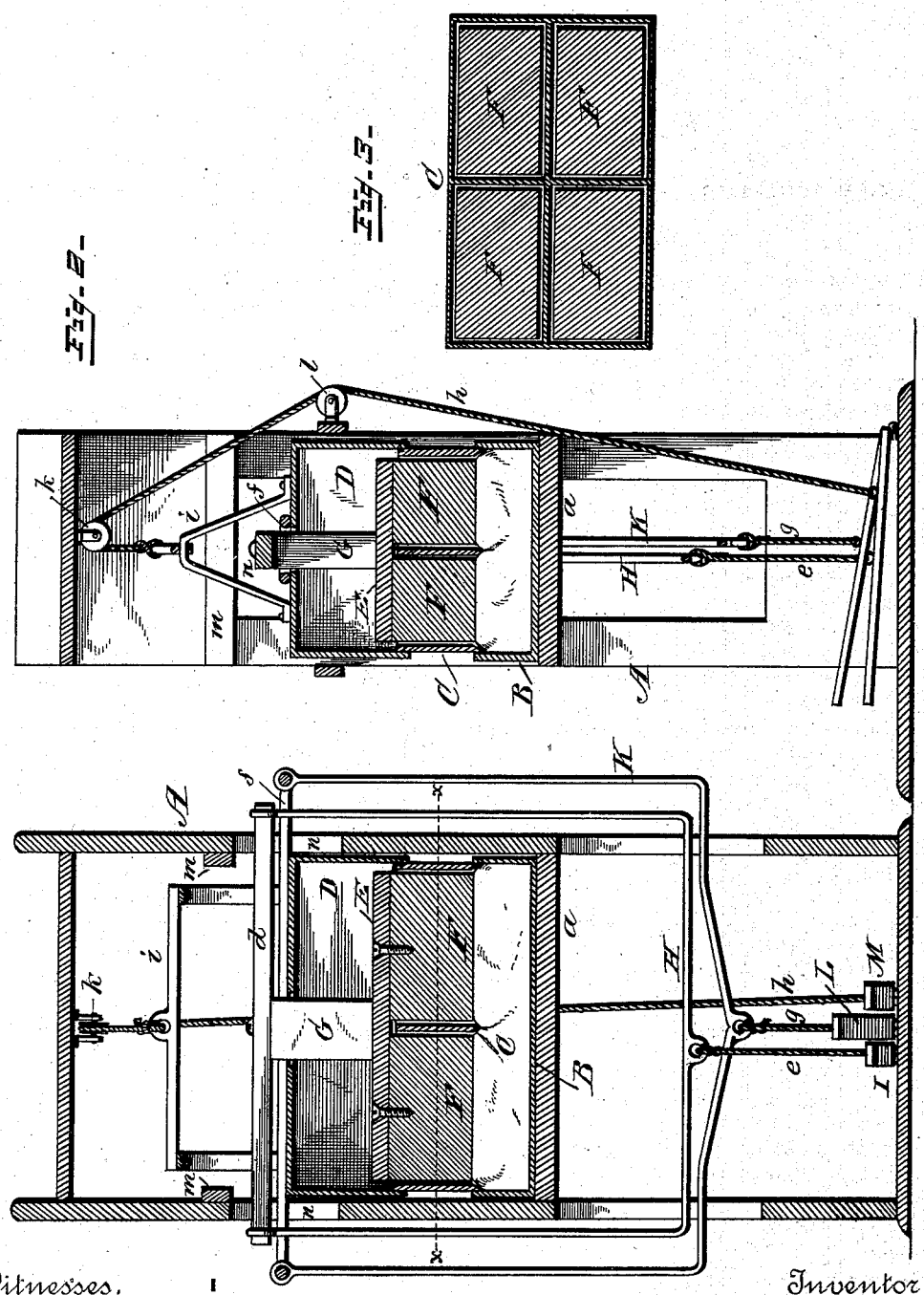

ABRAHAM DAY, OF BLOOMFIELD, NEW JERSEY.

MACHINE FOR CUTTING DOUGH.

SPECIFICATION forming part of Letters Patent No. 384,964, dated June 26, 1888.

Application filed January 17, 1888. Serial No. 260,989. (No model.)

*To all whom it may concern:*

Be it known that I, ABRAHAM DAY, a citizen of the United States, residing at Bloomfield, in the county of Essex and State of New Jersey, have invented certain new and useful Improvements in Machines for Cutting Dough; and I do hereby declare that the following is a full, clear, and exact description of the same, reference being had to the annexed drawings, making a part of this specification, and to the letters and figures of reference marked thereon.

Figure 1 of the drawings is a longitudinal vertical section of my improved machine; Fig. 2, a transverse vertical section thereof; and Fig. 3, a horizontal section of the cutters and plungers, taken on line $x\ x$ of Fig. 1.

The present invention has for its object to provide a machine that will successfully and expeditiously divide or cut dough for bakers' use into an equal number of parts and of uniform weight, either for loaves of a small or large size, rolls, biscuits, and other purposes; and the invention consists in the several details of construction, substantially as shown in the drawings, and hereinafter described and claimed.

In the accompanying drawings, A represents a stationary frame of any suitable size and shape, which is provided with a table, $a$, for supporting thereon a removable pan, B, to contain the dough. The cutter C is in the form of a frame, the blades thereof extending longitudinally and transversely to divide the frame into several equal parts, as shown in Fig. 3. I have shown but four of such parts in order to better illustrate the practicability of the machine; but it is the purpose to have the cutter adapted to divide the dough into a large number of parts, and to attain this the cutting-blades will be proportionately increased as circumstances require. This cutter is permanently and rigidly connected to the interior of a guide-box, D, and within this box works a plunger, E, to the lower side of which are connected in any suitable manner the blocks F for releasing the dough from the blades of the cutter after the dough has been divided by the descent of said cutter. This plunger E, as will be noticed, is of sufficient length and breadth to conveniently carry the required number of blocks, which may be detachably connected thereto, so as to admit of their being removed for cleaning. These blocks serve two functions in both releasing the dough from the cutter-blades and also compressing it previous to cutting.

The plunger E is provided with a neck, G, which extends upward through an opening in the top of the box D and has connected to it a bar, $d$. The ends of this bar extend through openings $n$ in the sides of the frame A, and have connected to them a yoke, H, said yoke being connected to a foot-treadle, I, by a chain or rope, $e$. The top of the box D has connected to it a long link, $f$, the ends thereof extending through the openings $n$ and beyond the sides of the frame, and to the ends of this link is connected a yoke, K, which in turn is connected to a foot-treadle, L, by a chain or rope, $g$. This link has an advantage over a single rod, as it forms a better and more perfect poise of the box, it being connected thereto on two different longitudinal planes from each side of the center of the box, and also allows the neck G to pass up through the link when the plunger is moved independent of the box and cutter. Cleats $m$ are secured to the interior sides of the frame A, immediately at the upper extremity of the openings $n$, to form stops for the arm $d$ and link $f$ to strike against to limit their upward movement, the blocks or cleats $m$ forming additional stops to the extremities of the openings $n$, so as to prevent too great a strain upon the sides of the frame A.

After the box and cutter are depressed by means of the treadle and yoke hereinbefore described, they are raised after the dough has been cut by means of a foot-treadle, M, and rope $h$, connected to a bail, $i$, secured to the top of the box, said rope passing over grooved pulleys $k$ $l$, secured to the top and side of the frame A, respectively. Any other means, however, may be employed for supporting the rope, so as to prevent friction and wear thereon. After the dough has been weighed and deposited in the pan B, the pan is placed on the table $a$, under the cutter C, after which the treadle I is depressed to bring the blocks F down on the dough to flatten it out and compress it over the surface of the pan in a condition to be operated upon by the blades of the cutters C. When this is accomplished, the treadle L is next depressed, and by means of the yoke connection the box D and cutter C are brought down, forcing the blades of the cutter through the dough and cutting it in the required number of parts of equal size and weight. The box, cutter, plunger, and blocks are now raised simultaneously by means of the treadle M, and when the bar d strikes the cleats m the plunger and blocks will remain stationary, while the box and cutter continue moving upward until the ends of the link f strike the cleats, the blocks thereby forcing the dough from off the blades of the cutter and into the pan, when the pan may be removed and supplied with a like quantity to be cut in equal parts, as before.

Having now fully described my invention, what I claim as new, and desire to secure by Letters Patent, is—

1. The combination, with the frame, table, and dough-pan, of the guide-box, the cutters carried thereby, the plunger working in said box, the blocks carried by said plunger, the neck to said plunger extending through the top of the box, the yoke connecting with said neck, a treadle connected with the yoke, the long link f, connected to the top of the box and having an opening through which said neck loosely works, and a stop, m, on the frame for engaging said yoke and link, and a yoke and treadle connected with said link, substantially as described.

2. In a machine for cutting dough, the box D, carrying the cutter C, the plunger E, working in said box, and blocks F, carried by said plunger, in combination with the frame A, having openings n and cleats m, the yokes H K and ropes e g h, connecting with foot-treadles, bar d, connected with said plunger, and link f, connected to the top of the box and to which the yokes are attached, substantially as and for the purpose specified.

In testimony that I claim the above I have hereunto subscribed my name in the presence of two witnesses.

ABRAHAM DAY.

Witnesses:
BERTHA DAY,
WILLIAM J. KINZS.